455-613 AU 233 EX
FIP3106 XR 3,796,831

United States Patent [19]
Bauer

[11] 3,796,831
[45] Mar. 12, 1974

[54] PULSE MODULATION AND DETECTION COMMUNICATIONS SYSTEM

[75] Inventor: John August Bauer, Medford, N.J.

[73] Assignee: RCA Corporation, New York, N.Y.

[22] Filed: Nov. 13, 1972

[21] Appl. No.: 305,697

[52] U.S. Cl. .................. 178/68, 307/234, 325/38 R, 325/322
[51] Int. Cl. .......................... H04b 1/10, H04b 1/16
[58] Field of Search ........ 178/88, 68, 66; 325/38 R, 325/42, 43, 141, 143, 321, 323, 322; 307/233, 234; 328/112, 162

[56] References Cited
UNITED STATES PATENTS 3,528,011 9/1970 Anderson .......................... 325/38 R
3,647,970 3/1972 Flanagan .......................... 179/1.5 R
3,555,434 1/1971 Sheen ................................ 307/234

*Primary Examiner*—Benedict V. Safourek
*Assistant Examiner*—Marc E. Bookbinder
*Attorney, Agent, or Firm*—Edward J. Norton; Robert L. Troike

[57] ABSTRACT

In a pulse modulation and detection communications system suitable for use with high-power carrier sources such as light emitting diodes or transferred electron oscillators, the zero axis crossings of an audio frequency signal are used to control the output pulse width of the carrier source. The carrier pulses are detected and frequency divided to provide a square wave exhibiting the same zero axis crossings as the original audio frequency signal. The detected square wave is filtered before being applied to an audio signal output device.

1 Claim, 3 Drawing Figures

PULSE MODULATION AND DETECTION COMMUNICATIONS SYSTEM

BACKGROUND OF THE INVENTION

The present invention relates to pulse modulation and detection communications systems, and more particularly, to such systems using high-power pulse carrier sources.

With the advent of high peak power carrier devices, such as light-emitting-diodes (LED's), solid state injection lasers or transferred-electron-devices (TEO's) there exists a need for simple and efficient communications systems which can utilize these high peak power devices for modulation and detection of audio or other low frequency signals. An example of one such application is ship-to-ship communications for military ships at sea. Heretofore, these military ships have utilized a communications system comprising a light source directed toward another ship and wherein the light source is modulated in an on-off code by mechanical shutter means. In one embodiment, the present invention provides a new and useful communications system which may be used to provide ship-to-ship communications.

SUMMARY OF THE INVENTION

In practicing the invention there is provided a system for pulse modulation communications including a signal input means adapted to receive an input signal. First means are coupled to the signal input for amplifying and limiting the input signal to provide a substantially square wave signal having a period determined by the zero axis crossings of the input signal. The first means is coupled to second means for generating a pulse of a predetermined pulse width in response to each point of discontinuity of the square wave. Third means including an output device coupled to the second means is provided for generating and transmitting a carrier signal during each pulse generated by the second means. A receiver in the system includes detection means responsive to the carrier signal for deriving a detected pulse signal having a pulse width determined by the transmitted carrier signal. The detected pulses are coupled to frequency divider means for providing a substantially square wave signal having a period determined by the time duration between successively detected pulses; and output means including filter means coupled to the frequency divider means provides an output signal which is a substantial reproduction of the original input signal.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
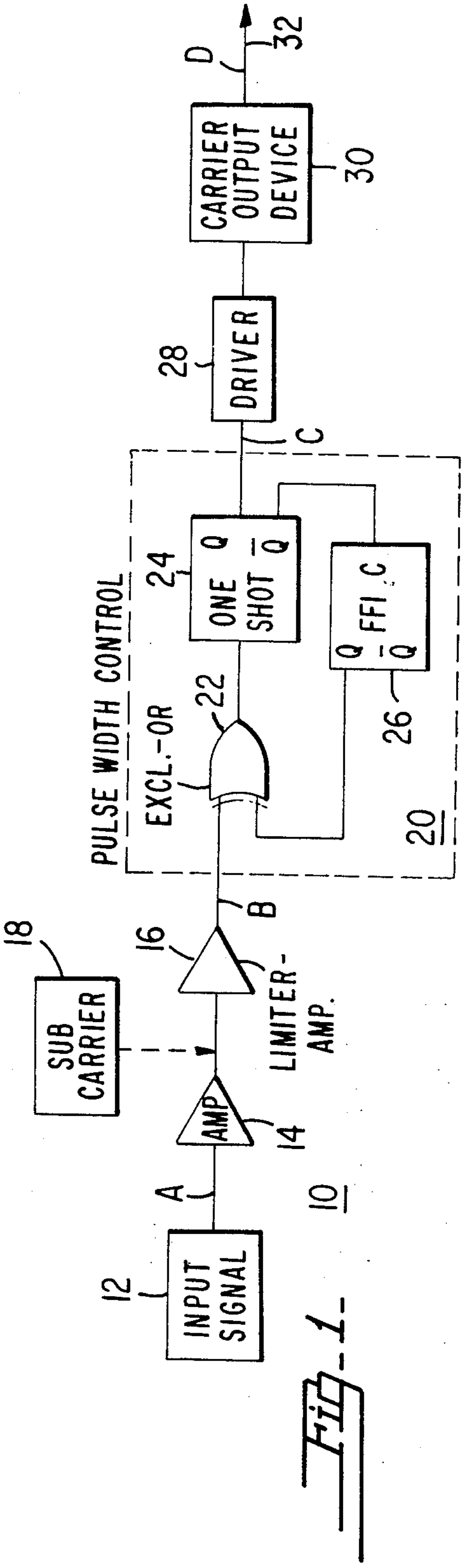
FIG. 1 is a block diagram illustrating a pulse modulator and transmission system in accordance with the principles of the present invention.

Referring now to FIG. 1, there is shown generally at 10 a modulator/transmitter in accordance with the present invention. An input signal source 12, which may be a microphone or other low frequency signal means, is coupled to an amplifier 14. Amplifier 14 which may be any suitable, conventional amplifier raises the level of the input signals provided by source 12. The output of amplifier 14 is coupled to a limiter-amplifier 16. Limiter-amplifier 16 provides hard-limiting or infinite clipping of its input signals to provide a substantially square wave output signal which is coupled to the input of pulse width control 20. The input of pulse width control 20 is coupled to a first input of exclusive-OR gate 22. The output of gate 22 is coupled to the input of a monostable multivibrator (one-shot) 24 of control 20. A complementary or $\overline{Q}$ output from one shot 24 is coupled to the clock pulse input of bistable multivibrator (flip-flop) 26. The Q output of one-shot 24 is coupled to the output of pulse width control 20. The Q output of flip-flop 26 is coupled to the second input of gate 22. The output of pulse width control 20 is coupled to driver stage 28, which in turn, has its output coupled to a carrier output device 30. Device 30, which may be a LED or TEO device, is shown coupled to transmitting means 32.

Figure 2:
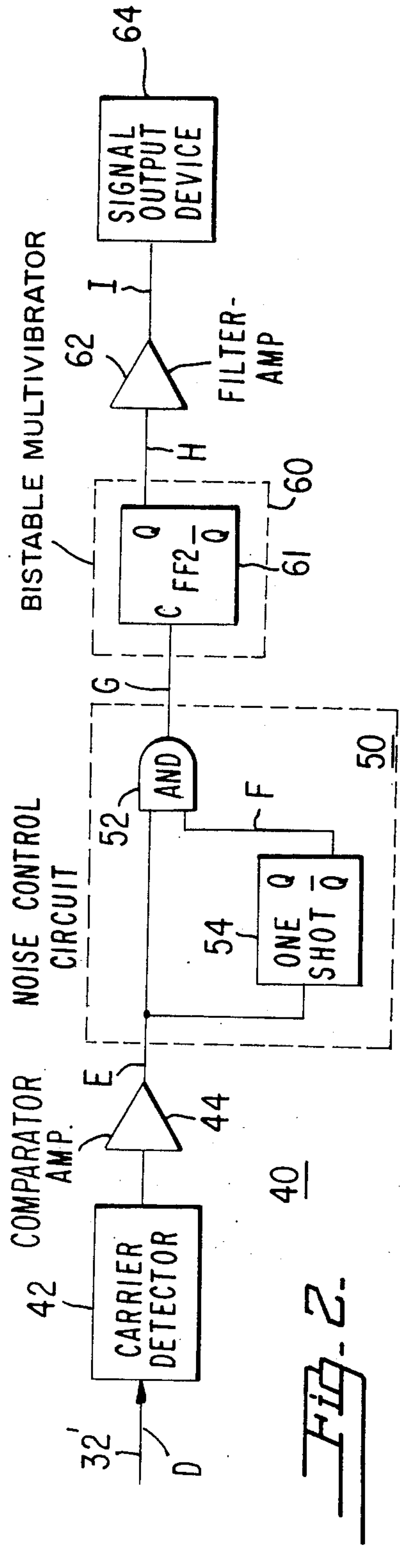
FIG. 2 is a block diagram of a pulse modulation detection and demodulation system adapted for use with the modulator and transmission system of FIG. 1.

Referring now to FIG. 2 there is shown generally at 40 a receiver/demodulator, in accordance with the principles of the present invention, which is suitable for use with modulator/transmitter 10 of FIG. 1. A carrier signal such as provided by system 10 is applied to carrier detector 42 by way of input means 32'. Carrier detector 42 may comprise a photo-cell detector or a RF-type detector suitable for detection of a signal in the frequency range as provided by, for example, a TEO device. Detector 42 essentially detects the envelope of the carrier signal at 32' and the output of detector 42 is applied to comparator/amplifier 44. Comparator/amplifier 44, which provides wave shaping and an amplitude limited output signal when the input has exceeded a predetermined threshold level, has its output coupled to noise control circuit 50. Control circuit 50 comprises an AND gate 52 and a one-shot multivibrator 54. The input of control circuit 50 is coupled to one input of AND gate 52 and the input of one-shot 54. The $\overline{Q}$ output of one-shot 54 is coupled to the second input of AND gate 52. The output of AND gate 52 is coupled to the output of control circuit 50, which in turn is coupled to the input of a circuit 60. Circuit 60 comprises bistable multivibrator (flip-flop) 61. The input of circuit 60 is coupled to the clock pulse input of flip-flop 61; and the output of circuit 60 is taken from the Q output of flip-flop 61. The output of circuit 60 is coupled to filter/amplifier 62. The output of filter/amplifier 62 is in turn coupled to a suitable signal output device 64 which may be a pair of earphones, an audio output circuit or other suitable output means.

Figure 3:
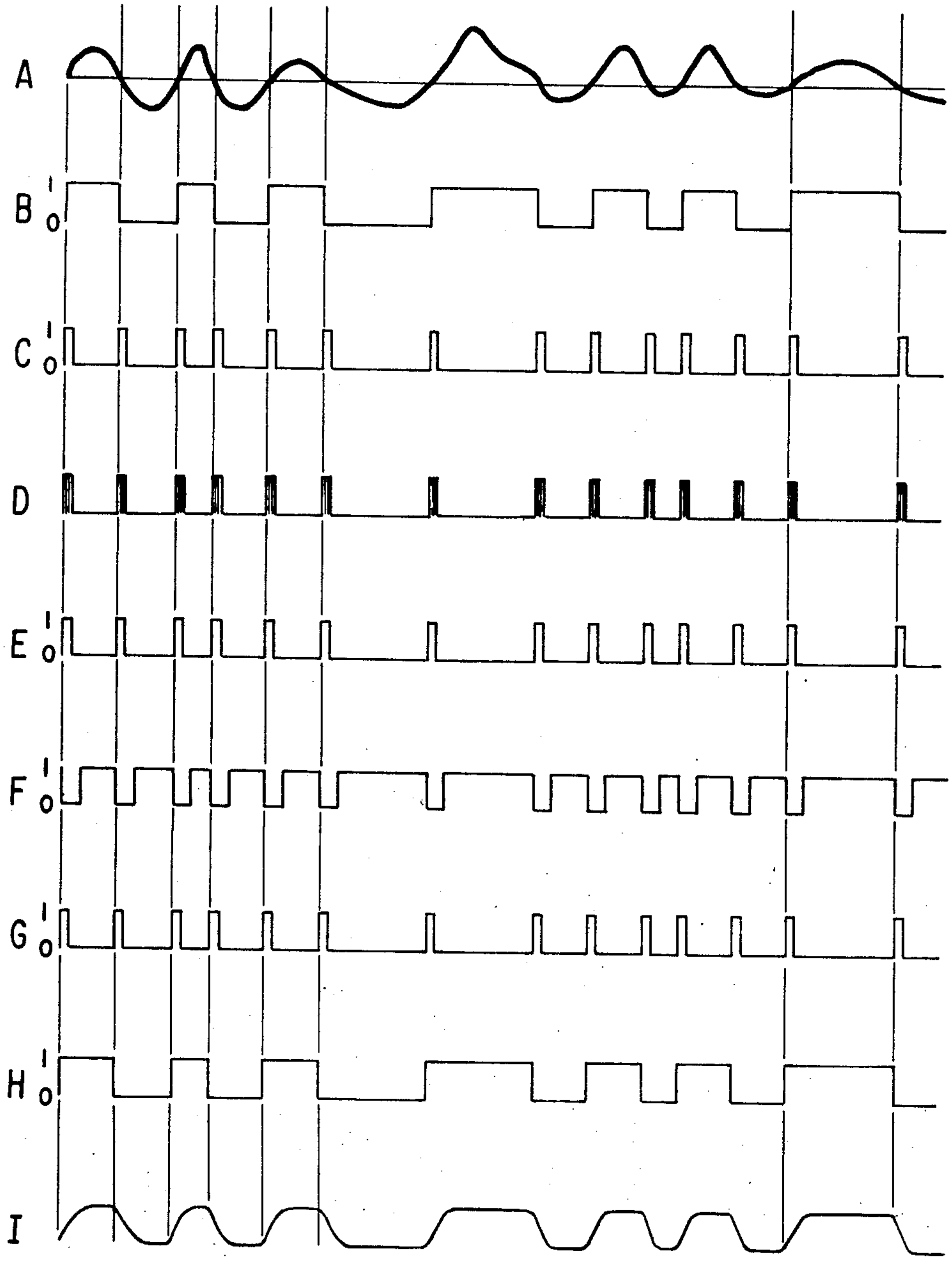
FIG. 3 is a graph depicting the wave forms of the signals generated at various stages in the systems of FIGS. 1 and 2.

Referring now to the operation of the pulse modulation communications system comprising the systems shown in FIGS. 1 and 2, the same will be more clearly understood by reference to the waveforms of FIG. 3. FIG. 3 illustrates the signal waveforms generated at various stages of the apparatus shown diagrammatically in FIGS. 1 and 2. The curves designated A through I of FIG. 3 represent the signals designated at A through I in FIGS. 1 and 2. The curve A of FIG. 3 is representative of a complex low frequency input signal such as a voice signal. The signal at A when amplified and limited by amplifiers 14 and 16 will appear as a substantially square wave signal B having a period determined by the zero axis crossings of the input signal at A. That is, each zero axis crossing of the input signal at A determined a point of discontinuity or transition of the square wave signal at B.

As is well known in the art, an exclusive-OR gate, such as gate 22 in FIG. 1, provides an output signal of one logic state when the two input signals applied to the gate are of the same logic state; and a second output state when the signals applied to its inputs are in different logic stages. Assuming initially that the Q output of flip-flop 26 is a logic 0, the logic state of one input signal applied to gate 22 will accordingly be a logic 0. Assuming also that there is initially no input signal at B, denoted as logic 0, the second input to gate 22 will likewise be a logic 0. Thus, since both inputs to gate 22 are initially at the same logic level (logic 0), the output of gate 22 will be a logic 0. When the input signals applied to gate 22 are in different logic states (i.e., logic 1 and logic 0, or logic 0 and logic 1) the output of gate 22 will be a logic 1. If both inputs to gate 22 are a logic 1, the output of gate 22 will be a logic 0.

At the first zero crossing of the input signal A, the leading edge of the signal at B will go to the logic 1 state. Accordingly, since the inputs to gate 22 are now in different logic states, the output of gate 22 will also go to the logic 1 state. At this time the Q output of one-shot 24 will go to the logic 1 state and remain in the logic 1 state for a period determined by the predetermined time constant characteristic of one-shot 24. Similarly the complementary or $\overline{Q}$ output of one-shot 24 will go to the logic 0 state for the predetermined output period of one-shot 24. The logic 1 at C is applied to the input of driver state 28 which in turn has its output coupled to carrier output device 30. The output of device 30 at D provides a pulse modulated carrier signal at a frequency determined by the selected characteristics of device 30 and for the duration of the logic 1 output of one-shot 24 at C. At the end of the predetermined fixed output period of one-shot 24, the $\overline{Q}$ output of one-shot 24 will return to the logic 1 state while its Q output returns to the logic 0 state; and the leading edge of the logic 1 signal at the $\overline{Q}$ output of one-shot 24 toggles flip-flop 26. Accordingly, the Q output of flip-flop 26 will now be in the logic 1 state and the input of gate 22 which is coupled to the Q output of flip-flop will likewise be a logic 1.

At the next zero crossing of input signal A, the logic level of the square wave signal B will go to the logic 0 state. The resulting logic level difference between the input signals applied to gate 22 will again cause a logic 1 to appear at the output of gate 22. Thus, the output of one-shot 24 will again be a logic 1 for the duration of the predetermined output period of one-shot 24. It can be seen, then, that pulse width control 20 generates a pulse of a predetermined pulse width in response to each point of discontinuity of transition of the square wave at B.

The carrier signal at D is coupled to transmitting means 32 which may be an antenna or a suitable light imaging apparatus, commensurate with the selected frequency of operation. Transmitting means 32 transmits the pulses modulated carrier signals to a companion receiver/demodulator, such as system 40 of FIG. 2. The transmitted signal D is gathered by input means 32', which may also be an antenna or suitable optical means, and applied, in turn, to carrier detector 42. Detector 42 may comprise a conventional RF detector, a photocell or other suitable detection means depending on the type of carrier signal embodied. The output of detector 42 is amplified and limited by comparator-amplifier 44 to provide a detected square wave pulse E having a pulse width determined by the carrier signal D. The comparator level of unit 44 is set to reject channel noise while responding to a set level of received signal.

The output of comparator-amplifier 44 at E is applied to noise control circuit 50. The output of circuit 50 at G is normally a replica of the input signal at E except during a predetermined blanking period as discussed below. The signal at G is coupled to the clock input C of flip-flop 61 in circuit 60. The Q output of flip-flop 61 changes state in response to the leading edge of each pulse applied to its clock input C. Accordingly, the output of circuit 60, at H, provides a substantially square wave signal having a period determined by the time duration between successively detected pulses at G. It can be seen that the signal developed at H is identical to the original signal developed at B in system 10 of FIG. 1. The signal developed at H contains the same zero crossing information as the original input signal at A in FIG. 1.

The signal at H is applied to filter-amplifier 62. Filter-amplifier 62 acts to integrate the signal input, at H, to provide a filtered output signal at I. The integration can, for example, be performed by a simple capacitive impedance arranged in shunt relationship with the signal path. The signal at I is applied to signal output device 64 which may comprise audio output circuitry, earphones, or other suitable signal utilization means. It can be seen that the frequency information content of the original signal at A is substantially reproduced at I. For many low frequency audio or voice signal applications, the output signal I is an adequate version of the original input signal so as to provide satisfactory reproduction of the intelligence information at the output of system 40. It will be understood by those skilled in the art that various active or passive filtering techniques may be employed at the output of circuit 60 in order to provide a more faithful reproduction of the original input signal. For example, filter-amplifier 62 may include a resonant circuit whose output, in response to a digital input signal, is a more perfect sine wave.

It should be noted that since the human ear is insensitive to the phase (or phase reversal) of a voice signal, the system in accordance with the present invention, may operate satisfactorily in an asynchronous manner. That is, the reproduced signal may be 180° out of phase from the original signal waveshape without affecting intelligibility. Further, the non-phase sensitivity of the human ear accommodates even the loss of pulses; and the phase of the detected signal may move in and out of phase with the original signal waveshape without affecting the operation of the system except, perhaps, to produce a transient noise.

A feature of the present invention is the noise blanking provided by noise control circuit 50 in system 40 of FIG. 2. The operation of noise control circuit 50 is as follows. Assuming initially that the $\overline{Q}$ output of one-shot 54 is a logic 1, it can be seen that before the application of the first detected pulse at E, the inputs to AND gate 52 will be a logic 0, at E, and a logic 1 at F. Accordingly, the output of AND gate 52 at G will be a logic 0. The leading edge of each signal at E provides a second logic 1 input to AND gate 52 and the resulting logic 1 output at G causes flip-flop 61 to toggle or change output states. At the same time the leading edge of each signal at E causes an output transition at the Q and $\overline{Q}$ outputs of one-shot 54. During the predetermined one-shot period, the $\overline{Q}$ output of one-shot 54 will be a logic 0 as shown at F. It should be noted, then, that after the leading edge of each detected pulse signal at E, a logic 0 at F will disable or blank the output of AND gate 52 for the predetermined one-shot period. Accordingly, a spurious or noise signal detected during this blanking period will not appear in the output signal at I, and a degree of noise immunity thereby results. It should be appreciated that the predetermined period of one-shot 54 can be selected to provide a blanking period equal to the interval between successive zero axis crossings of the highest input signal frequency.

Referring now more specifically to the operation of the pulse width control 20 of system 10 in FIG. 1, it should be appreciated that the predetermined pulse width output of control 20 can be selected to provide optimum performance, including efficiency, with respect to the output device 30. For example, if output device 30 is a LED or injection laser, the predetermined pulse width of one-shot 24 may be in the nanosecond region. This is made possible because of the fast response times of these high frequency devices. If output device 30 is a conventional RF output device, such as a TEO device, the predetermined pulse width provided by control 20 may be selected to provide a greater pulse width consistent with the operating characteristics and optimum performance of the RF output device 30.

For increased output signal fidelity, the pulse modulation communications system, in accordance with the present invention, may also include a subcarrier signal means such as subcarrier generator 18 in FIG. 1. For typical voice communications having a bandwidth, for example, between 300 and 3,000 Hz, a suitable subcarrier frequency would be, for example 4KHz. The output of subcarrier generator 18 is coupled to the input of limiter-amplifier 16 such that the subcarrier signal is algebraically added to the input signal A. The result being that the square wave signal B will experience a discontinuity corresponding to each zero axis crossing of the algebraically added resultant signal. Accordingly, pulse width control circuit 20 will provide a predetermined pulse output corresponding to each zero crossing of the algebraically added signals. In order to reproduce only the input signal A at the output of system 40 of FIG. 2, filter-amplifier 62 would include, for example, means having an upper cut-off frequency at 3KHz. Accordingly, only those frequencies below 3KHz would selectively pass therethrough and the filtered output of amplifier 62 would provide an output signal at I which is a more faithful reproduction of the input signal at A. According to the well-known Nyquist criteria, if the subcarrier signal is of a frequency equal to twice the frequency of the highest input signal component, all of the intelligence information of input signal A can be faithfully reproduced at I. It should be noted that this increased output signal fidelity is at the expense of operating efficiency since the operating duty cycle of systems 10 and 40 is accordingly increased.

It should be appreciated that circuit 60, which cooperates with the zero axis information provided by system 10 of FIG. 1, provides a measure of security since the carrier signal must be frequency divided by circuit 60 in order to reproduce the original signal.

What has been taught, then, is a simple, efficient and inexpensive pulse modulation communications system, facilitating, notably, voice communications. The pulse modulation communications system can be implemented, essentially in its entirety, with solid state digital devices thereby providing low cost, high reliability and low power consumption. The system, in accordance with the present invention, is particularly suitable for use with high-frequency, high-peak power devices as discussed above.

What is claimed is:

1. A pulse modulation communications system comprising, in combination:

a signal input means adapted to receive an input signal definable by zero axis crossings, first means coupled to said signal input means for amplifying and limiting said input signal to provide a substantially square wave signal having a period determined by the zero axis crossings of said input signal;

second means coupled to said first means for generating a pulse of a predetermined pulse width in response to each point of discontinuity of said square wave;

third means including an output device coupled to said second means for generating and transmitting a carrier signal during each pulse generated by said second means;

detection means responsive to said carrier signal for deriving a detected pulse signal having a pulse width determined by the transmitted carrier signal;

frequency divider means coupled to said detection means, said frequency divider means being responsive to said detected pulse signal for providing a substantially square wave signal having a period determined by the time duration between successively detected pulses; and output means including filter means coupled to said frequency divider means for filtering the square wave signal provided by said frequency divider means to provide an output signal which is a substantial reproduction of said input signal wherein said second means comprises: an exclusive-OR logic gate having first and second input terminals and an output terminal, a one-shot multivibrator having an input terminal, an output terminal and a complementary output terminal, and a bistable multivibrator having a toggle input and an output terminal;

wherein said first input terminal of said logic gate is coupled to said first means and said output terminal of said logic gate is coupled to said input terminal of said one-shot multivibrator;

wherein said output terminal of said one-shot multivibrator is coupled to said third means and said complementary output of said one-shot multivibrator is coupled to said toggle input of said bistable multivibrator; and wherein said output terminal of said bistable multivibrator is coupled to said second input of said exclusive-OR gate.

* * * * *